(12) United States Patent
Ono

(10) Patent No.: US 7,822,794 B2
(45) Date of Patent: Oct. 26, 2010

(54) DATA RECORDING APPARATUS AND DATA FILE TRANSMISSION METHOD IN DATA RECORDING APPARATUS

(75) Inventor: Yoshimasa Ono, Osaka (JP)

(73) Assignee: SANYO Electric Co., Ltd., Osaka (JP)

( * ) Notice: Subject to any disclaimer, the term of this patent is extended or adjusted under 35 U.S.C. 154(b) by 308 days.

(21) Appl. No.: 11/921,142

(22) PCT Filed: May 26, 2006

(86) PCT No.: PCT/JP2006/310566

§ 371 (c)(1),
(2), (4) Date: Nov. 26, 2007

(87) PCT Pub. No.: WO2006/126679

PCT Pub. Date: Nov. 30, 2006

(65) Prior Publication Data

US 2009/0119251 A1   May 7, 2009

(30) Foreign Application Priority Data

May 27, 2005   (JP) .............................. 2005-156398

(51) Int. Cl.
*G06F 17/00* (2006.01)
(52) U.S. Cl. ...................................... 707/964; 707/968
(58) Field of Classification Search .............. 707/964, 707/968
See application file for complete search history.

(56) References Cited

U.S. PATENT DOCUMENTS 5,815,730 A    9/1998 Kim ........................... 395/825

2004/0213552 A1   10/2004 Kato ........................... 386/69
2007/0112714 A1*   5/2007 Fairweather .................. 706/46
2009/0148133 A1*   6/2009 Nomura et al. .............. 386/124

FOREIGN PATENT DOCUMENTS

| JP | 06-282299 | 10/1994 |
|---|---|---|
| JP | 07-319751 | 12/1995 |
| JP | 07-319901 | 12/1995 |
| JP | 08-255466 | 10/1996 |
| JP | 11-232846 | 8/1999 |
| JP | 2001-296895 | 10/2001 |
| JP | 2003-006979 | 1/2003 |
| JP | 2003-204536 | 7/2003 |
| JP | 2003-323267 | 11/2003 |
| JP | 2005-099107 | 4/2005 |

* cited by examiner

*Primary Examiner*—Sana Al-Hashemi
(74) *Attorney, Agent, or Firm*—Gerald T. Bodner

(57) ABSTRACT

The invention has as its object to selectively reproduce on an external apparatus apart of digital data with index that a user wants to reproduce out of the digital data being made up of audio data and/or video data without having to use an application program dedicated for the external apparatus.

The present invention is characterized in that in a case that a data file linked with a position information file is to be transmitted to the external apparatus, there are provided a data file divider which performs division processing on the data file on the basis of predetermined positions on the time axis of the digital data specified by the position information to thereby create a plurality of divided data files and a data file transmitter for transmitting the divided data files created by the data file divider to the external apparatus.

18 Claims, 9 Drawing Sheets

FIG. 3

| INDEX NUMBER | | INDEX POSITION ABSOLUTE FRAME NUMBER |
|---|---|---|
| No. 1 | STARTING POINT | 48k FRAMES |
| | ENDING POINT | 120k FRAMES |
| No. 2 | STARTING POINT | 144k FRAMES |
| | ENDING POINT | 192k FRAMES |

FIG. 8

| INDEX NUMBER | | INDEX POSITION ABSOLUTE FRAME NUMBER |
|---|---|---|
| No. 1 | STARTING POINT | 96k FRAMES |
| | ENDING POINT | 240k FRAMES |
| No. 2 | STARTING POINT | 288k FRAMES |
| | ENDING POINT | 384k FRAMES | ns
DATA RECORDING APPARATUS AND DATA FILE TRANSMISSION METHOD IN DATA RECORDING APPARATUS

FIELD OF THE INVENTION

The present invention relates to a data recording apparatus. More specifically, the present invention relates to a data recording apparatus having a function of writing delimiters of the data (hereinafter referred to as "index") at an arbitrary position on a time axis of digital data being made up of audio data and/or video data and a function of transmitting data file including the digital data to an external apparatus.

BACKGROUND

Conventionally, there is IC recorder, for example, as a data recording apparatus which fetches an audio signal or a music signal and converts the same into audio data to obtain digital data, and creates a data file including the digital data, and stores the data file in a recording medium. Furthermore, as a data recording apparatus which fetches a moving image signal and converts the same into video data being digital data, and creates a data file including the digital data to store the data file in a recording medium, there is a digital camera, for example.

Some data recording apparatuses set indexes to digital data being made up of audio data and/or video data at arbitrary positions on a time axis in a data file while a user records a sound, music, or moving images. In reproducing, a part of the digital data from which a user wants to reproduce is searched on the basis of the indexes, making it possible to selectively reproduce only the searched part of the digital data. The index (positional information indicative of positions on a time axis) to be set is normally held as an index file that is separate from the data file, and records the positional information on the time axis of the digital data by being linked with the digital data.

Furthermore, in a case that such a data recording apparatus is made a USB connection with an external apparatus of the information processing apparatus and so on such as PC, or the like (hereinafter referred to as a PC), and the data file stored in a memory of the data recording apparatus is to be reproduced on the PC, after the data file is transmitted to the PC, the data file is reproduced by utilizing an application program on the PC.

Patent Document 1: Japanese Patent Application Laid-open No. 8-255466

DISCLOSURE OF THE INVENTION

Problem to be Solved by the Invention

However, in order to selectively reproduce on the PC the part of the digital data with index that the user wants to reproduce out of the digital data of the data file stored in the memory of such a data recording apparatus, it is needed after the data file and the index file to which the index linked with the part of the digital data is written are transmitted to the PC, to link the data file and the index file with each other by utilizing an dedicated application program for PC.

That is, there are problems that without utilizing the dedicated application program for linking the data file and the index file with each other, the user cannot search on the PC the part of the digital data that he or she wants to reproduce on the basis of the index written in the data recording apparatus, and thus, the user cannot selectively reproduce only the part of the digital data that the user wants to reproduce on the PC.

It is an object of the present invention to selectively reproduce on the PC digital data with an index that the user desires to reproduce out of the digital data without necessity of an application program dedicated for PC.

Means to Solve the Problem

A data recording apparatus recited in claim 1 is characterized in the data recording apparatus which stores a data file including digital data being made up of audio data and/or video data and a position information file recorded with position information indicating positions on a time axis of the digital data by being linked with the data file in that the apparatus comprises a data file divider for performing division processing on the data file on the basis of a predetermined position on the time axis of the digital data specified by the position information to create a plurality of divided data files in a case that the data file linked with the position information file is to be transmitted to an external apparatus and a data file transmitter for transmitting a divided data file created by the data file divider to the external apparatus.

An invention according to claim 2 is characterized in that the apparatus further comprises a connector to be connected to the external apparatus, and when the connector is connected to the external apparatus, the data file divider creates the divided data files in the data recording apparatus according to claim 1.

An invention according to claim 3 is characterized in that the data file divider records divided file connection information at a predetermined part of each of the created divided data files, in the data recording apparatus according to claim 1.

An invention according to claim 4 is characterized in that the data file divider creates a folder for storing the plurality of created divided data files, and the data file transmitter transmits the folder to the external apparatus, in the data recording apparatus according to any one of claims 1 to 3.

An invention according to claim 5 is characterized in that the apparatus further comprises a data file selector for selecting one or more divided data files out of the plurality of divided data files created by the data file divider to be transmitted to the external apparatus by the data file transmitter, in the data recording apparatus according to claim 1.

A data file transmitting method of the data recording apparatus according to claim 6 is a data file transmitting method of the data recording apparatus storing a data file including digital data being made up of audio data and/or video data and a position information file recorded with position information indicating a position on a time axis of the digital data by being linked with the data file, and characterized by performing division processing on the data file on the basis of a predetermined position on the time axis of the digital data specified by the position information to create a plurality of divided data files in a case that the data file linked with the position information file is to be transmitted to an external apparatus and transmitting a divided data file to the external apparatus.

An invention according to claim 7 is characterized by creating the divided data files when a connecting means is connected to the external apparatus, in a transmitting method of data recording apparatus according to claim 6 while the recording apparatus further comprises the connecting means for connecting to the external apparatus.

An invention according to claim 8 is characterized by recording divided file connection information at a predetermined part of each of the divided data files, in a transmitting method of the data recording apparatus according to claim 6 or 7.

An invention according to claim 9 is characterized by creating a folder for storing the plurality of created divided data files, and by transmitting the folder to the external apparatus, in a transmitting method of the data recording apparatus according to any one of claims 6 to 8.

An invention according to claim 10 is characterized by selecting one or more divided data files to be transmitted to the external apparatus out of the plurality of created divided data files, in a transmitting method of the data recording apparatus according to claim 6.

Advantages of the Invention

According to the data recording apparatus of the present invention, in a case that the data file linked with the position information data file is to be transmitted to the external apparatus, since the file divider makes the division processing to divide the data file into a plurality of data files at predetermined positions specified as the position information before transmission, the external apparatus thus receives the divided data file created on the basis of the position information. This makes it possible to select only the data file that the user desires to reproduce in the external device out of the plurality of data files created by the division processing on the basis of the position information. That is, just as by linking the data file and the position information file, the data part specified on the basis of the position information is selectively reproduced, it is possible to selectively reproduce the part of the data that the user desires to reproduce. Therefore, without utilizing an application program dedicated for the external apparatus for linking the data file and the position information file with each other, it is possible to selectively reproduce the part of the data that the user desires to reproduce.

In a case that transmission of the data file is performed via the connector connecting the data recording apparatus and the external apparatus, the division process for the data file by the data file divider is executed at a time when the connector is connected to the external apparatus, and therefore, the data file automatically divided in response to the connection of the connector that is required for transmitting the data files created by the division to the external apparatus as a condition can be transmitted to the external apparatus. This makes it possible to eliminate troublesome tasks of setting an index division mode, etc. described later by the user in the data recording apparatus.

Furthermore, the file connection information is recorded at a predetermined part of each of the divided data files created by the data file divider, so that after the data file divider creates a plurality of divided data files from the data file, these divided data files can be coupled together in the external apparatus. This makes it possible to restore the data file before division in the external apparatus, and continuously reproduce the data in a state of the data file before division.

Furthermore, since the data file divider creates a folder that stores a plurality of divided data files after the division process, and the data file transmitter transmits the folder to the external apparatus, the divided data files can be stored in a mass by brought them into association with the data file before division in the external apparatus, which allows the user to easily know which data file each of the divided data files belonged to.

In addition, the data file selector selects one or more divided data files to be transmitted to the external apparatus from the data transmitter, and therefore, the external apparatus can receive only the selected one or more data files. This makes it possible to reproduce one or more data files which the user desires to reproduce in the external apparatus without selection.

EMBODIMENTS OF THE INVENTION

In what follows, an IC recorder 1 according to a first embodiment of the present invention will be described.

FIG. 1 is a block diagram showing a schematic configuration of the IC recorder 1 according to the first embodiment.

A power supply circuit 3 is constructed by a battery 4, a switch SW1, etc., and for supplying a voltage to the entire IC recorder 1.

An MCU (microcontroller unit) 5 performs various controls described later in the IC recorder 1 in response to an operation by a user of a key input device 11. Furthermore, the MCU 5 has an audio data file dividing circuit 5a functioning as a data file divider and an audio data file selecting circuit 5b functioning as a data file selector.

The audio data file dividing circuit 5a divides an audio data file read from a flash memory 8 into a plurality of audio data files. The audio data file selecting circuit 5b selects an audio data file to be transmitted to a PC 2 from the plurality of audio data files divided by the audio data file dividing circuit 5a.

A DSP 7 performs compression and expansion of digital audio data. An A/D and D/A converter 18 converts an analog audio signal into digital audio data, and digital audio data into an analog audio signal. The flash memory 8 stores an audio data file including audio data being digital data and an index data file to which index data is written. A bus 9 is a channel for sending and receiving audio data among the DSP 7, the flash memory 8 and a memory 10 in the IC recorder 1 and transmitting a control signal input to or output from the MCU 5.

The memory 10 temporarily stores the audio data output from the DSP 7. A key input device 11 is provided with keys and buttons not shown, and outputs a control signal to the MCU 5 depending on the depressed state to allow an operation control of the IC recorder 1 desired by the user.

A speaker 13 outputs the analog audio signal amplified in an amplifier 12b as a sound to the outside of the IC recorder 1. A microphone 17 is for inputting a sound from the outside, and outputting the sound to the A/D and D/A converter 18 as an analog audio signal. The amplifier 12b amplifies an analog audio signal to output it to the speaker 13. Furthermore, the amplifier 12a amplifies the analog audio signal output from the microphone 17.

A GPIO (General Purpose I/O (general-purpose-input/output)) 14 detects, on the basis of a change of a USB bus power voltage described later supplied from the PC 2 to the entire IC recorder 1 through a USB terminal 16 described later, an establishment of the connection between the USB terminal 16 of the IC recorder 1 and a USB terminal not shown of the PC 2.

A USB controller 15 functions as a data file transmitter, and performs a control of transmission and reception of an audio data file, etc. between the IC recorder 1 and the PC 2. The USB terminal 16 functions as a connector connecting means, and is connected to the USB terminal not shown provided to the PC 2 to allow the transmission and reception of audio data files between the IC recorder 1 and the PC 2.

The PC 2 is one example of an information processing apparatus, functions as an external apparatus, and executes various information processing. Furthermore, the PC 2 is connected to the IC recorder 1 via the USB terminal 16, and executes transmission and reception of audio data files with the IC recorder 1.

The IC recorder 1 in the first embodiment has an audio reproduction function, an audio record function and an external storage function. In what follows, the control processing by the MCU 5 relating to these functions will be described.

1) Audio Record Function

The audio record function in the first embodiment is a function of recording a sound from the outside into the IC recorder 1, and specifically a function of storing into the flash memory 8 the sound from the outside captured by the microphone 17 as encoded and compressed audio data in a file format of MP3.

First, when a turning-on operation of a power switch not shown provided to the power supply circuit 3 is performed in a state that the IC recorder 1 is not connected to the PC 2, that is, in the USB-unconnected state, the switch SW1 shifts from an off state to an on state to supply the voltage from the battery 4 to the entire IC recorder 1.

When an audio recording operation is performed by the key input device 11 in a USB-unconnected state, the MCU 5 sets the DSP 7 into a compression mode. The A/D and D/A converter 18 converts an analog audio signal which is captured by the microphone 17 and amplified by the amplifier 12a into digital audio data, and outputs the converted digital audio data to the DSP 7. The DSP 7 compresses the output audio data, and stores the compressed audio data in the memory 10. The MCU 5 stores the compressed audio data accumulated in the memory 10 in the flash memory 8 in the file format of MP3.

When an index operation is performed by the user in the key input device 11 during recording the sound, indexes representing positions of the audio data on the time axis included in the audio data file are set so as to be brought into correspondence with predetermined parts of the audio data as shown in FIG. 2. That is, when an index operation is performed, the MCU 5 creates an index data file with linkage it to the audio data file, and stores the created index file in the flash memory 8. In the index file, the index data as shown in FIG. 3, that is, an index number indicating the position of the index from the head of the audio data and positions of a starting point and an ending point of the part of the audio data corresponding to the index number (index position absolute frame number (the number of frames from the head of the audio data)) are written by the MCU 5. It should be noted that "frame" described here is units of the audio data dealt in a mass in executing compression and expansion.

Then, after completion of recording the audio data file, division of the audio data file on the basis of the index data is performed in response to an operation by the user. The division of the audio data file is performed after a folder having a name the same as that of the audio data file before division is first created in the flash memory 8 in a manner that as shown in FIG. 2, the audio data file dividing circuit 5a divides the audio data file at the position of the starting point of the index with No. 1, and successively divides the audio data file at the position of the ending point of the index with No. 1, the position of the starting point of the index with No. 2, the position of the ending point of the index with No. 2 in this order. After completion of the dividing the audio data file, file connection information for restoring the audio data file before division is recorded at a predetermined part of each of the divided data files divided by the audio data file dividing circuit 5a. It should be noted that the divided data files obtained by the dividing processing are stored in the folder created at the beginning of the division processing and having the name the same as that of the audio data file before division.

The file connection information is a filename of the audio data file before division, a total number of the divided data files created by division, positions of the divided data files on the time axis of the audio data file before division. The PC 2 to which the respective divided data files divided by the audio data file dividing circuit 5a are transmitted becomes able to restore the audio data file before division by means of such the information if being equipped with a dedicated edit application program being compliant with the divided data files. It should be noted that transmission of the divided data files to the PC 2 will be described later.

2) Audio Reproduction Function

The audio reproduction function in the first embodiment is a function of reproducing an audio data file recorded in the IC recorder 1, and specifically a function of expanding and decoding the encoded and compressed audio data being stored in the flash memory 8 in the file format of MP3 and then outputting it from the speaker 13.

First, when an audio reproducing operation is performed by the key input device 11 in a USB-unconnected state, the MCU 5 sets the DSP 7 to an expansion mode, and reads the audio data file stored in the flash memory 8 through the bus 9. The read audio data file is output to the DSP 7 through the memory 10.

Here, when an audio data file division operation is performed by the key input device 11, the audio data file dividing circuit 5a divides the audio data file read from the flash memory 8 into a plurality of audio data files, and outputs these audio data files to the DSP 7. Furthermore, if the division operation of the audio data file is division based on the indexes, the audio data file dividing circuit 5a divides the audio data file read from the flash memory 8 into a plurality of audio data files at predetermined positions specified by the indexes, and outputs these audio data files to the flash memory 8.

The DSP 7 expands compressed audio data included in the audio data file read from the flash memory 8, and the expanded digital audio data is converted into an analog audio signal by the A/D and D/A converter 18, and output from the speaker 13 through the amplifier 12b.

In addition, reproduction of the audio data part in correspondence to the index written at a time of recording in the index data file is performed by the MCU 5, after reading positions of the audio data corresponding to the starting point and the ending point written in the index data file, by reproducing the audio data of the area sandwiched between the starting point and the ending point.

3) External Storage Function

The external storage function in the first embodiment is a function of transmitting and receiving an audio data file, etc. with the PC 2 in response to an access request from the PC 2.

First, when the IC recorder 1 is connected to the PC 2 by the USB terminal 16, that is, a USB-connected state is transferred, a USB bus power voltage is supplied from the PC 2 to the entire IC recorder 1.

When an external storage mode selecting operation is performed by the key input device 11 in the USB-connected state, the MCU 5 accesses the flash memory 8 in response to the access request from the PC 2. If the access request is a request for writing a file, the MCU 5 writes the audio data file applied together therewith from the PC 2 to the flash memory 8 through the bus 9. Furthermore, if the access request is a request for reading (transmitting) an audio data file, the MCU 5 reads a desired audio data file stored in the flash memory 8 through the bus 9, and transmits the read audio data file to the PC 2 through the USB controller 15 and the USB terminal 16.

Next, transmission processing of an audio data file to the PC 2 by the MCU 5 in the IC recorder 1 according to the first embodiment will be described with reference to FIG. 4.

Here, transmission of the divided audio data files to the PC 2 in the first embodiment is performed in an index division mode. The setting of the index division mode is performed by selecting in advance an audio data file that the user desires to divide, and selecting an index division mode for dividing the audio data in the audio data file at positions where the indexes are written at a time of recording.

First, a folder having a name the same as that of the audio data file before division and for storing the divided audio data files is created in the flash memory 8 (S1). Next, as shown in FIG. 2, the audio data file dividing circuit 5a divides the audio data file at a position of the starting point of the index with No. 1, and successively divides the audio data file at a position of the ending point of the index with No. 1, a position of the starting point of the index with No. 2, a position of the ending point of the index with No. 2 in this order (S2). After completion of dividing the audio data file (S3), the audio data file dividing circuit 5a records file connection information at predetermined parts of each of the divided audio data files (S4).

Next, the audio data file dividing circuit 5a stores theses divided audio data files in the folder already created in the flash memory 8 (S5). Next, in accordance with a selecting operation of the divided audio data files by utilizing the key input device 11 by the user, the audio data file selecting circuit 5b selects an audio data file to be transmitted to the PC 2 out of the divided audio data files, and changes a part of the filename of the selected audio data file to allow the MCU 5 to determine which is the selected audio data file when receiving a transmission request from the PC 2 described later (S6).

After completion of selecting a part or all of the divided audio data files in the step S6, when the user connects the IC recorder 1 to the PC 2, the GPIO 14 detects an establishment of the connection between the USB terminal 16 of the IC recorder 1 and the USB terminal not shown of the PC 2 on the basis of the change of the USB bus power voltage supplied to the entire IC recorder 1 from the PC 2 via the USB terminal 16 (S7). Next, when the MCU 5 receives a file transmission request from the PC 2 via the USB controller 15 (S8), the USB controller 15 transmits the folder created in the step S1 and the selected audio data file stored therein to the PC 2 under control of the MCU 5 through the USB terminal 16 (S9).

Thus, in a case that an audio data file linked with the index data file is transmitted to the PC 2, the audio data file is divided into a plurality of audio data files at positions where the audio data file dividing circuit 5a writes the indexes during recording in the IC recorder 1 before transmission, so that the PC 2 receives these divided audio data files. This makes it possible to select only the audio data file desired to be reproduced by the user out of the plurality of audio data files on the PC 2. That is, just as by linking the audio data file and index data file IC in the recorder 1, the audio data part specified on the basis of the index is selectively reproduced, it is possible to selectively reproduce the part of the audio data that the user desires to reproduce on the PC 2. Thus, it is possible to selectively reproduce the part of the audio data which the user desires to reproduce without utilizing an application program dedicated for the PC for linking the audio data file and the index data file.

Furthermore, since the audio data file dividing circuit 5a records the file connection information at a predetermined part of each of the divided audio data files, after the audio data file is divided into a plurality of audio data files by the audio data file dividing circuit 5a, these divided audio data files can be coupled together according to the file connection information on the PC 2. Thus, if a dedicated edit application program being compliant with the file connection information is provided, it is possible to restore the audio data file before division on the PC 2 and continuously reproduce the audio data in a state of the audio data file before division.

Furthermore, the audio data file dividing circuit 5a creates the folder for storing a plurality of divided audio data files, and the USB controller 15 transmits the folder to the PC 2. Thus, the PC 2 can store the divided audio data files by bringing them into association with the audio data file before division in a mass, which makes it easy to know which audio data file each of the divided audio data files belongs to.

In addition, the audio data file selecting circuit 5b selects one or more divided audio data files to be transmitted by the USB controller 15 to the PC 2, and therefore, the PC 2 can receive only the one or more selected audio data files on the basis of the index data recorded in the index data file. This makes it possible to reproduce one or more audio data files which the user desires to reproduce without selection on the PC 2.

Next, transmission processing of an audio data file to the PC 2 by the MCU 5 in the IC recorder according to a second embodiment of the present invention will be described with reference to FIG. 5. A description as to parts in common with the IC recorder according to the first embodiment will be omitted.

Here, transmission of divided audio data files to the PC 2 in the second embodiment is performed in the file transmission mode. Setting the file transmission mode is executed by selecting in advance an audio data file desired to be transmitted to the PC 2, and then selecting the file transmission mode as to the audio data file.

First, the GPIO 14 detects an establishment of the connection between the USB terminal 16 of the IC recorder 1 and the USB terminal of the PC 2 not shown on the basis of the change of the USB bus power voltage supplied to the entire IC recorder 1 from the PC 2 via the USB terminal 16 (S11), and outputs a signal indicating this to the MCU 5 through the bus 9. When receiving the signal, the MCU 5 creates a folder having a name the same as that of the audio data file before division and for storing the divided audio data files in the flash memory 8 (S12).

Next, the audio data file dividing circuit 5a divides, as shown in FIG. 2, the audio data file selected in advance so as to be desired to be transmitted to the PC 2 at a position of the starting point of the index with No. 1, and successively divides it at a position of the ending point of the index with No. 1, a position of the starting point of the index with No. 2, and a position of the ending point of the index with No. 2 in this order (S13). After completion of dividing the audio data file (S14), the audio data file dividing circuit 5a records file connection information at a predetermined part of each of the divided audio data files (S15). Next, the audio data file dividing circuit 5a stores theses divided audio data files in the folder which has already created in the flash memory 8 (S16).

Then, when the MCU 5 receives a file transmission request from the PC 2 via the USB controller 15 (S17), the USB controller 15 transmits the folder created in the step S12 and the divided audio data files stored therein to the PC 2 through the USB terminal 16 (S18).

Thus, in a case that transmission of the audio data file is performed via the USB terminal 16 connected to the PC 2, division of the audio data file by the audio data file dividing circuit 5a is executed when the USB terminal 16 is connected to the PC 2, and therefore, in response to the connection of the USB terminal 16 to the PC 2 required for transmitting the divided audio data files, the divided audio data files can easily be transmitted to the PC 2. This makes it possible to eliminate troublesome tasks of setting an index division mode by the user in the IC recorder 1, and so forth.

Next, a digital camera 21 according to a third embodiment in the present invention will be described.

FIG. 6 is a block diagram showing a schematic configuration of a digital camera 21 according to the third embodiment.

A power supply circuit 23 is made up of a battery 24, a switch SW2, etc., and supplying a voltage to the entire digital camera 21.

A CPU 26 executes various controls in response to an operation of a key input device 31 by the user in the digital camera 21. A signal processing circuit 25 includes a moving image data file dividing circuit 25*a* functioning as a data file divider and a moving image data file selecting circuit 25*b* functioning as a data file selector.

The moving image data file dividing circuit 25*a* divides a moving image data file read from a detachable memory card 28 as a recording medium into a plurality of moving image data files. The moving image data file selecting circuit 25*b* selects a moving image data file to be transmitted to a PC 22 out of the plurality of moving image data files divided by the moving image data file dividing circuit 25*a*.

The signal processing circuit 25 performs compression and expansion of the digital moving image data. The memory card 8 stores a moving image data file being made up of moving image data as digital data and an index data file to which index data is written. A bus 29 is a channel for transmitting and receiving moving image data among the signal processing circuit 25, the memory card 28, and the SDRAM 30 and for transmitting a control signal input to and output from the CPU 26 in the digital camera 21.

An SDRAM 30 temporarily stores the moving image data output from an A/D converter 38. A key input device 31 has keys and buttons not shown, outputs a control signal to the CPU 26 in accordance with the depressed state, and allows an operation control of the digital camera 21 desired by the user.

A display device 33 works in a moving image reproduction function described later, and displays moving image data input via an interface 32.

An imaging device 37 is for outputting an analog moving image signal being a video signal obtained by photographing or imaging to an A/D converter 38. The A/D converter 38 converts the analog moving image signal obtained by the imaging device into digital moving image data being digital data being made up of video data.

A GPIO 34 detects, on the basis of a change of a USB bus power voltage described later supplied from the PC 22 to the entire digital camera 21 through a USB terminal 36 described later, an establishment of the connection between the USB terminal 36 of the digital camera 21 and a USB terminal not shown of the PC 22, and outputs a signal indicative this to the CPU 26.

A USB controller 35 functions as a data file transmitter, and performs a control of transmission and reception of a moving image data file, etc. between the digital camera 21 and the PC 22. The USB terminal 36 functions as a connector or connecting means, and is connected to the USB terminal not shown provided to the PC 22 to allow the transmission and reception of the moving image data files between the digital camera 21 and the PC 22.

The PC 22 is one example of the information processing apparatus, and functions as an external apparatus to perform various information processing. Furthermore, the PC 22 is connected to the digital camera 21 via the USB terminal 36, and performs transmission and reception of the moving image data files with the digital camera 21.

The digital camera 21 according to this embodiment has a moving image reproduction function, a moving image record function, and an external storage function. In what follows, control processing of the CPU 26 in relation to these functions will be described.

1) Moving Image Record Function

The moving image record function in the third embodiment is a function of photographing a moving image by the digital camera 21, and specifically a function of storing a moving image captured by an imaging device 37 as encoded and compressed moving image data in a predetermined file format in a memory card 28.

First, when a turning-on operation of a power switch not shown provided to the power supply circuit 23 is performed in a state that the digital camera 21 is not connected to the PC 22, that is, in the USB-unconnected state, the switch SW2 shifts from an off state to an on state to supply voltage from the battery 24 to the entire digital camera 21.

When a moving image recording operation is performed by the key input device 31 in a USB-unconnected state, the CPU 26 sets the signal processing circuit 25 to a compression mode. The A/D converter 38 converts an analog moving image signal captured by the imaging device 37 into digital moving image data, and outputs the converted digital moving image data to the signal processing circuit 25. The signal processing circuit 25 compresses the output moving image data, and accumulates the compressed moving image data in the SDRAM 30. The signal processing circuit 25 converts the compressed moving image data stored in the SDRAM 30 into a moving image data file having a predetermined file format and stores the same in the memory card 28.

When an index operation is performed by the user by the key input device 31 during the record of the moving image, indexes indicating the positions of the moving image data on the time axis included in the moving image data file are set so as to be brought into correspondence with the predetermined parts of the moving image data as shown in FIG. 7. That is, when the index operation is performed, the signal processing circuit 25 creates an index data file having a linkage to the moving image data file, and stores the created index file in the memory card 28. In the index file, the index data as shown in FIG. 8, that is, an index number indicating the position of the index from the head of the moving image data and positions of the starting point and the ending point of the moving image data corresponding to the index number (index position absolute frame number (the number of frames from the head of the moving image data)) are written by the signal processing circuit 25.

Then, after completion of the moving image recording operation, division of the moving image data file on the basis of the index data is performed in response to an operation by the user. That is, the division of the moving image data file is performed after a folder having a name the same as that of the moving image data file before division is first created in the memory card 28 in a manner that, as shown in FIG. 7, the moving image data file dividing circuit 25*a* divides the moving image data file at the position of the starting point of the index with No. 1, and divides the moving image data file at the position of the ending point of the index with No. 1, the position of the starting point of the index with No. 2, and the position of the ending point of the index with No. 2 in this order. After completion of the dividing the moving image data file, file connection information for restoring the moving image data file before division is recorded at a predetermined part of each of the divided data files divided by the moving image data file dividing circuit 25*a*. It should be noted that the divided data files obtained by the division processing is stored in the folder having a name the same as that of the moving image data file before division created in the memory card 28 at the beginning of the division processing.

The file connection information is a filename of the moving image data file before division, a total number of the divided data files created by division, positions of the divided data file on the time axis of the moving image data file before division, etc. The PC 2 to which the respective divided data files divided by the moving image data file dividing circuit 25*a* are transmitted becomes able to restore the moving image data file before division by means of such the information if being equipped with a dedicated edit application program being compliant with the divided data files. It should be noted that transmission of the divided data files to the PC 22 will be described later.

2) Moving Image Reproduction Function

The moving image reproduction function in the third embodiment is a function of reproducing a moving image data file recorded by the digital camera 21, and is specifically a function of expanding and decoding the encoded and compressed moving image data stored in a predetermined file format in the memory card 28 to display the moving image on a display 33.

First, when a reproducing operation is performed by the key input device 31 in a USB-unconnected state, the CPU 26 sets the signal processing circuit 25 to an expansion mode, and reads the moving image data file stored in the memory card 28 through the bus 29. The read moving image data files are expanded and decoded in the signal processing circuit 25, and then output to an interface 32. Additionally, the signal processing circuit 25 uses the SDRAM 30 as a working buffer.

Here, when a moving image data file division operation is performed by the key input device 31, the moving image data file dividing circuit 25*a* divides the moving image data file read from the memory card 28 into a plurality of moving image data files, and outputs these moving image data files to the memory card 28. Furthermore, if the division operation of the moving image data file is division based on the indexes, the moving image data file dividing circuit 25*a* divides the moving image data file read from the memory card 28 into a plurality of moving image data files at predetermined positions specified by the indexes, and outputs these moving image data files to the memory card 28.

The signal processing circuit 25 expands the compressed moving image data included in the moving image data file read from the memory card 28, and displays the expanded digital moving image data on the display device 33.

Reproduction of the part of the moving image data in correspondence to the index written in the index data file at a time of recording is performed by the signal processing circuit 25 reading positions of the moving image data corresponding to the starting point and the ending point written to the index data file, and then reproducing the moving image data of the area sandwiched between the starting point and the ending point.

3) External Storage Function

The external storage function in the third embodiment is a function of transmitting and receiving a moving image data file, etc. with the PC 22 in response to an access request from the PC 22.

First, when the digital camera 21 is connected to the PC 22 by the USB terminal 36, that is, shifts to a USB-connected state, a USB bus power voltage is supplied from the PC 22 to the digital camera 21.

When an external storage mode selecting operation is performed by the key input device 31 in the USB-connected state, the CPU 26 accesses the memory card 28 according to the access request from the PC 22. If the access request is a request for writing a file, the CPU 26 writes the moving image data file applied from the PC 22 to the memory card 28 through the bus 29. Furthermore, if the access request is a request for reading (transmitting) a moving image data file, the CPU 26 reads a desired moving image data file stored in the memory card 28 through the bus 29, and transmits the read moving image data file to the PC 22 through the USB controller 35 and the USB terminal 36.

Next, transmission processing of moving image data files to the PC 22 by the CPU 26, the signal processing circuit 25 and the USB controller 35 controlled by the CPU 26 in the digital camera 21 in the third embodiment will be described with reference to FIG. 9.

Here, transmission of the divided moving image data files to the PC 22 in the third embodiment is performed in an index division mode. Setting the index division mode is performed by selecting in advance a moving image data file that the user desires to divide, and then selecting an index division mode for dividing moving image data in the moving image data file at positions where indexes are written during recording.

First, a folder having a name the same as that of the moving image data file before division and for storing the divided moving image data files is created in the memory card 28 (S21). Next, as shown in FIG. 2, the moving image data file dividing circuit 25*a* divides the moving image data file at a position of the starting point of the index with No. 1, and successively divides it at a position of the ending point of the index with No. 1, a position of the starting point of the index with No. 2, and a position of the ending point of the index with No. 2 in this order (S22). After completion of dividing the moving image data file (S23), the moving image data file dividing circuit 25*a* records file connection information at a predetermined part of each of the divided moving image data files (S4).

Next, the moving image data file dividing circuit 25*a* stores theses divided moving image data files in the folder already created in the memory card 28 (S25). Next, in response to the user performing a selecting operation of the divided moving image data files by the key input device 31, the moving image data file selecting circuit 25*b* selects an moving image data file to be transmitted to the PC 22 out of the divided moving image data files, and changes a part of the filename of the selected moving image data file to allow the CPU 26 to determine which is the selected moving image data file when receiving a transmission request from the PC 22 described later (S26).

After completion of dividing a part or all of the divided moving image data files in the step S26, when the user connects the digital camera 21 to the PC 22, the GPIO 34 detects an establishment of the connection between the USB terminal 36 of the digital camera 21 and the USB terminal not shown of the PC 22 on the basis of the change of the USB bus power voltage supplied to the digital camera 21 from the PC 22 via the USB terminal 36 (S27). Next, when the CPU 26 receives a file transmission request from the PC 22 via the USB controller 35 (S28), the USB controller 35 transmits the folder created in the step S21 and the selected moving image data file stored therein to the PC 22 through the USB terminal 36 under control of the CPU 26 (S29).

Thus, in a case that a moving image data file linked with the index data file is transmitted to the PC 22, the moving image data file is divided into a plurality of moving image data files at positions where the moving image data file dividing circuit 25a writes the indexes during recording in the digital camera 21 before transmission, so that the PC 22 receives these divided moving image data files. This makes it possible to select only the moving image data file that the user desires to reproduce out of the plurality of moving image data files on the PC 22. That is, just as by linking the moving image data file and the index data file on the digital camera 21, the part of the moving image data specified on the basis of the index is selectively reproduced, it is possible to selectively reproduce the part of the moving image data that the user desires to reproduce on the PC 22. In addition, without utilizing an application program dedicated for the PC for linking the moving image data file and the index data file with each other, it is possible to selectively reproduce the part of the moving image data which the user desires to reproduce.

Furthermore, the moving image data file dividing circuit 25a records file connection information at a predetermined part of each of the divided moving image data files, so that after the moving image data file is divided into a plurality of moving image data files by the moving image data file dividing circuit 25a, these divided moving image data files can be coupled together according to the file connection information on the PC 22. Thus, if a dedicated edit application program being compliant with the file connection information is provided, it is possible to restore the moving image data file before division in the PC 22, and continuously reproduce the moving image data in a state of the moving image data file before division.

Furthermore, the moving image data file dividing circuit 25a creates a folder for storing a plurality of divided moving image data files, and the USB controller 35 transmits the folder to the PC 22. Thus, the PC 22 can store the divided moving image data files in a mass by bringing them into association with the moving image data file before division on the PC 22, which makes it easy to know which moving image data file each of the divided moving image data files belongs to.

In addition, the moving image data file selecting circuit 25b selects one or more divided moving image data files to be transmitted to the PC 22 by the USB controller 35, and therefore, the PC 22 can receive only the one or more selected moving image data files on the basis of the index data recorded in the index data file. This makes it possible to reproduce one or more moving image data files which the user desires to reproduce on the PC 22 without selection.

Next, transmission processing of moving image data files to the PC 22 by the CPU 26, the signal processing circuit 25 controlled by the CPU 26 and the USB controller 35 in the digital camera according to a fourth embodiment of the present invention will be described with reference to the FIG. 10. A description as to parts in common with the digital camera according to the third embodiment will be omitted.

Here, transmission of divided moving image data files to the PC 22 in the fourth embodiment is performed in a file transmission mode. Setting the file transmission mode is executed by selecting in advance a moving image data file desired to be transmitted to the PC 22, and then selecting the file transmission mode as to the moving image data file.

First, the GPIO 34 detects an establishment of the connection between the USB terminal 36 of the digital camera 21 and the USB terminal not shown of the PC 22 on the basis of the change of the USB bus power voltage supplied to the entire digital camera 21 from the PC 22 via the USB terminal 36 (S31), and outputs a signal indicating this to the CPU 26 through the bus 29. When receiving the signal, the CPU 26 creates a folder having a name the same as that of the moving image data file before division and for storing the divided moving image data files in the memory card 28 (S32).

Next, as shown in FIG. 7, the moving image data file dividing circuit 25a divides the moving image data file selected in advance so as to be desired to be transmitted to the PC 22 at a position of the starting point of the index with No. 1, and successively divides the moving image data file at a position of the ending point of the index with No. 1, a position of the starting point of the index with No. 2, a position of the ending point of the index with No. 2 in this order (S33). After completion of dividing the moving image data file (S34), the moving image data file dividing circuit 25a records file connection information at a predetermined part of each of the divided moving image data files (S35). Next, the moving image data file dividing circuit 25a stores theses divided moving image data files in the folder already created in the memory card 28 (S36).

Then, when the CPU 26 receives a file transmission request from the PC 22 via the USB controller 35 (S37), the USB controller 35 transmits the folder created in the step S32 and the divided moving image data files stored therein to the PC 22 through the USB terminal 36 (S38).

Thus, in a case that transmission of the moving image data files is performed via the USB terminal 36 connected to the PC 22, division of the moving image data file by the moving image data file dividing circuit 25a is executed when the USB terminal 36 is connected to the PC 22, so that in response to the connection of the USB terminal 36 required to transmit the divided moving image data files to the PC 22, the divided moving image data files can easily be transmitted to the PC 22. This makes it possible to eliminate troublesome tasks of setting an index division mode and so on by the user in the digital camera 21.

Although the first to fourth embodiments of the present invention were described in the above, in the data recording apparatus according to the present invention and data file transmitting method in the data recording apparatus, the data file to be dealt may include digital data being made up of audio data and video data.

Furthermore, the division processing of the data file is performed by dividing the original data file itself without leaving the original data file, and may be performed by leaving the original data file and creating a divided data files anew. A filename of the divided data files created by the division processing may arbitrarily be decided such as applying serial numbers, and so forth so as to make it easy to know the positions of the files.

Furthermore, transmission of the data files created by the division processing and the folder storing the data files to the external apparatus may not be started by the IC recorder or the digital camera that is a data recording apparatus by receiving a transmission request from the PC that is an external apparatus, the IC recorder or the digital camera as a data recording apparatus itself automatically and of its own will may start the transmission without a request for a transmission request from the PC as an external apparatus. If do so, the step S8 shown in FIG. 4, the step S17 shown in FIG. 5, the step S28 shown in FIG. 9, and the step S37 shown in FIG. 10 are not required.

BRIEF DESCRIPTION OF THE DRAWINGS

FIG. 3 is data structure of an index data file stored in the flash memory of the IC recorder shown in FIG. 1.

FIG. 8 is data structure of an index data file stored in the memory card of the digital camera shown in FIG. 6.

Figure 1:
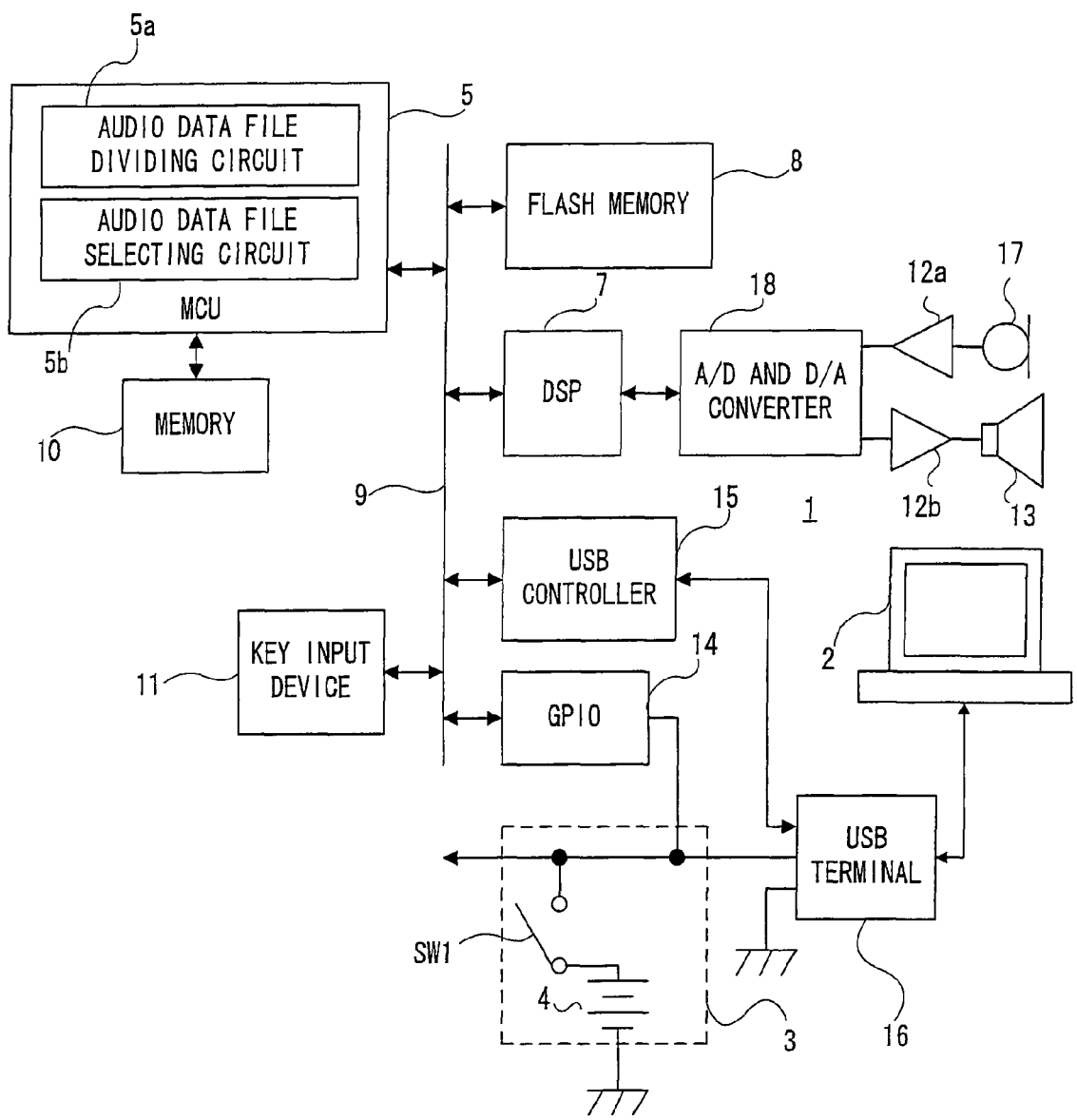
FIG. 1 is a block diagram showing a schematic configuration of an IC recorder according to an embodiment of the present invention.
Figure 2:
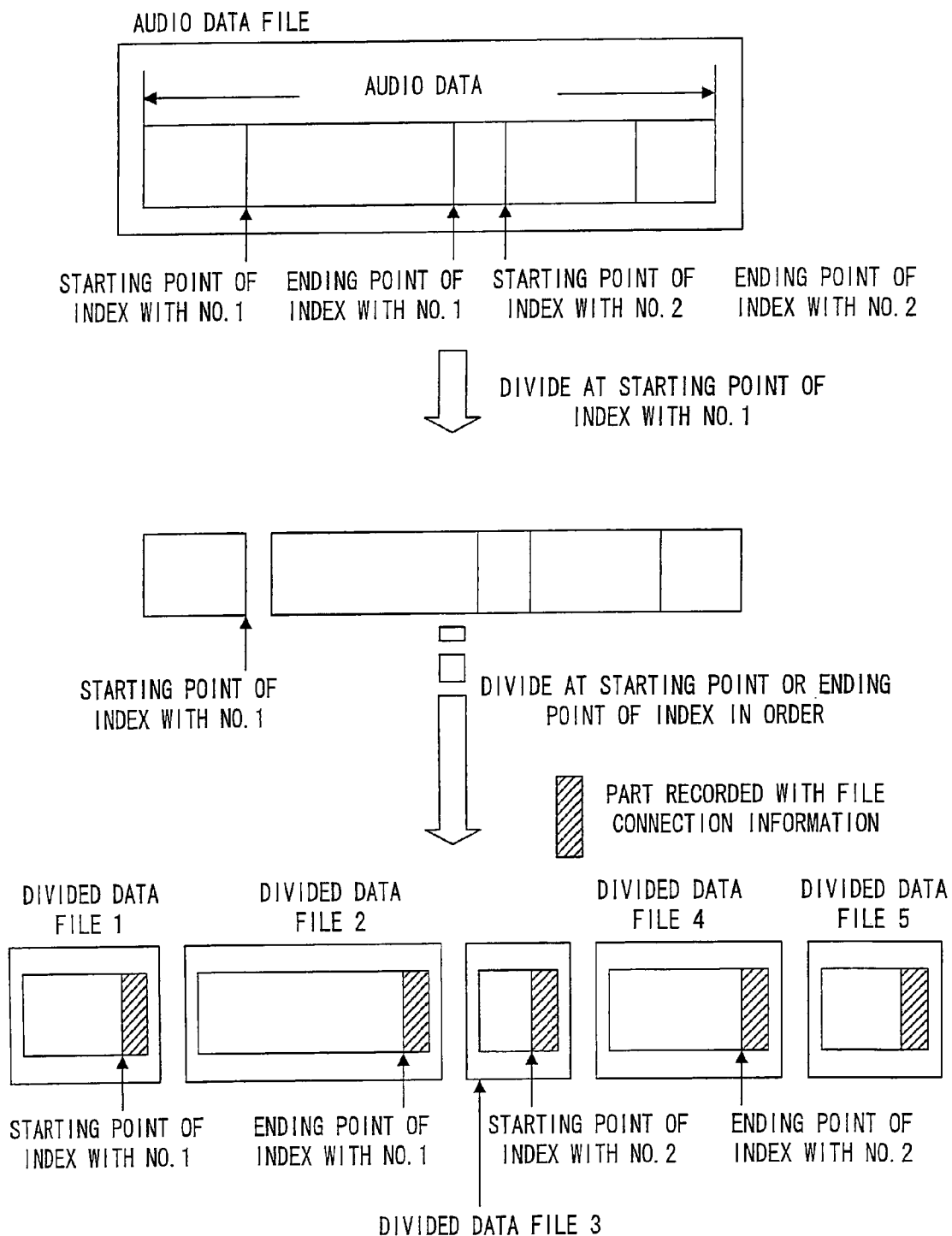
FIG. 2 is audio data making up of an audio data file stored in a flash memory of the IC recorder shown in FIG. 1.
Figure 4:
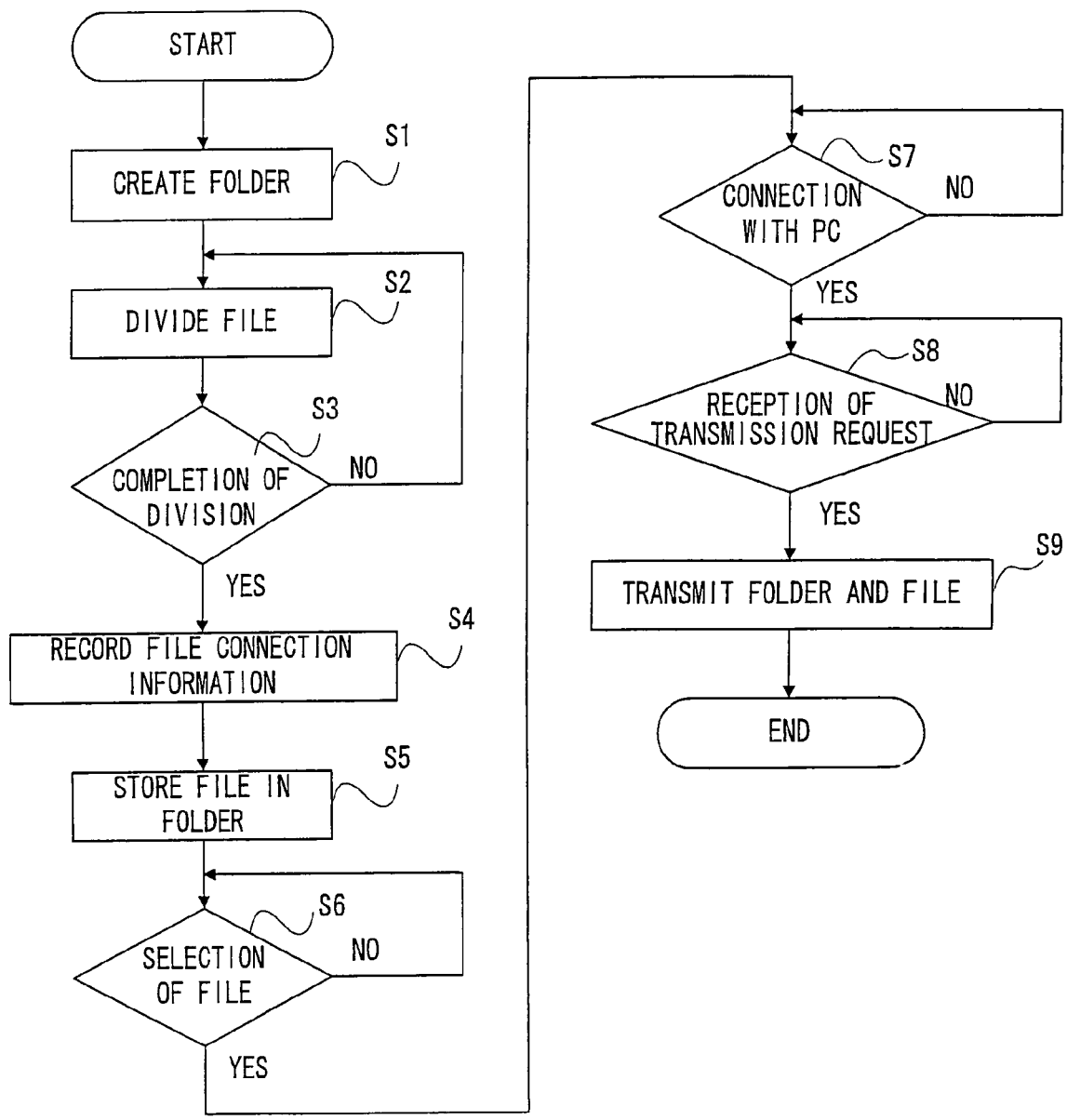
FIG. 4 is a flowchart showing transmission processing of an audio data file in the IC recorder to a PC according to a first embodiment of the present invention.
Figure 5:
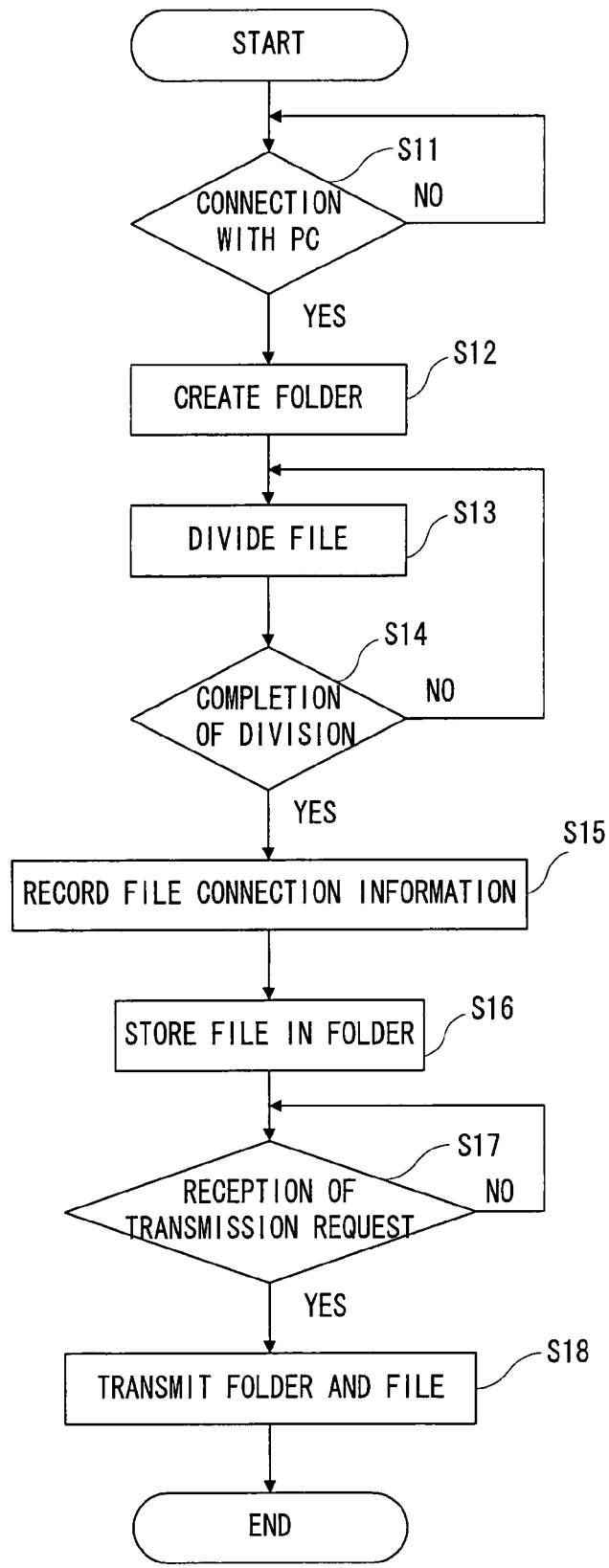
FIG. 5 is a flowchart showing transmission processing of an audio data file in the IC recorder to the PC according to a second embodiment of the present invention.
Figure 6:
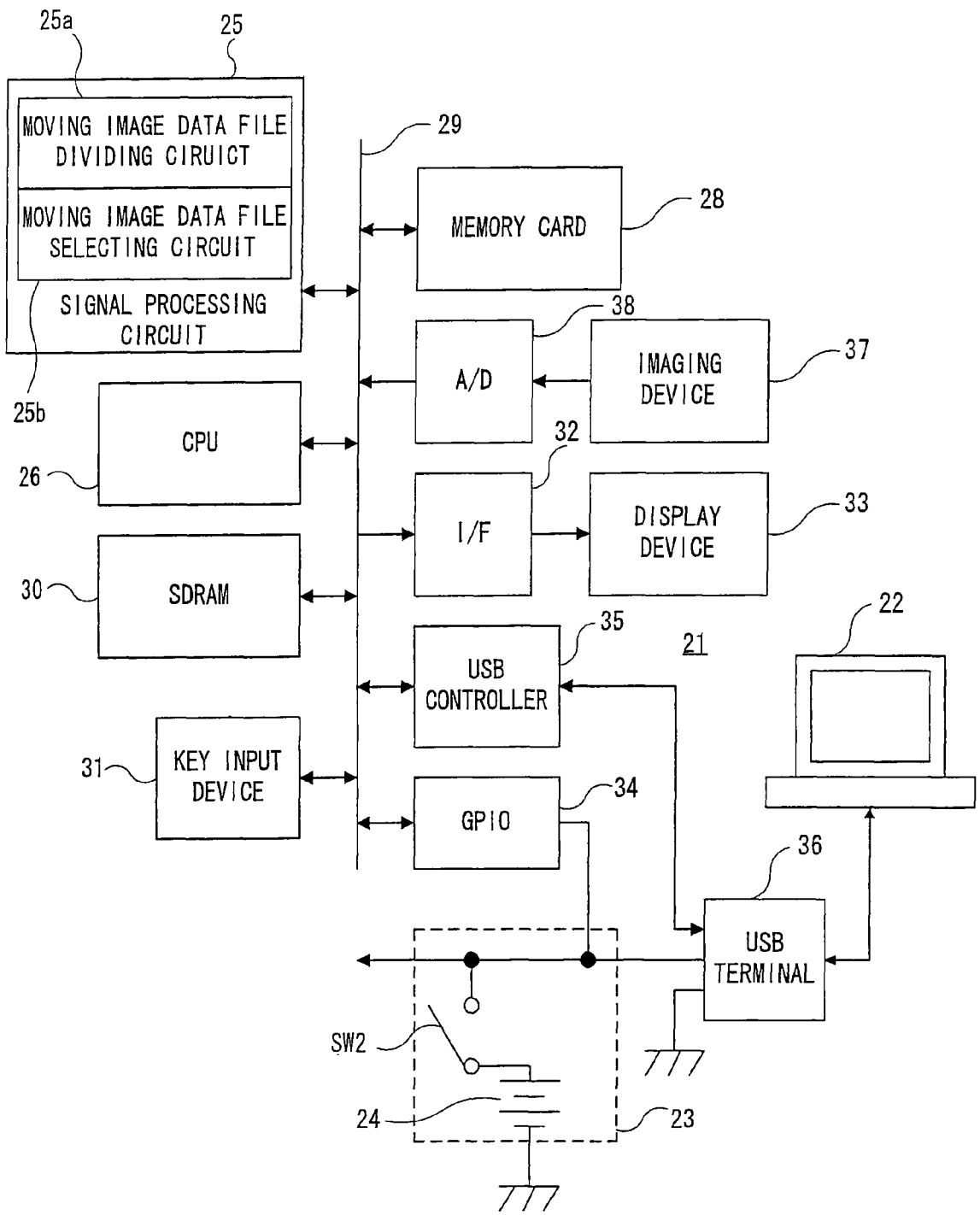
FIG. 6 is a block diagram showing a schematic configuration of a digital camera according to an embodiment of the present invention.
Figure 7:
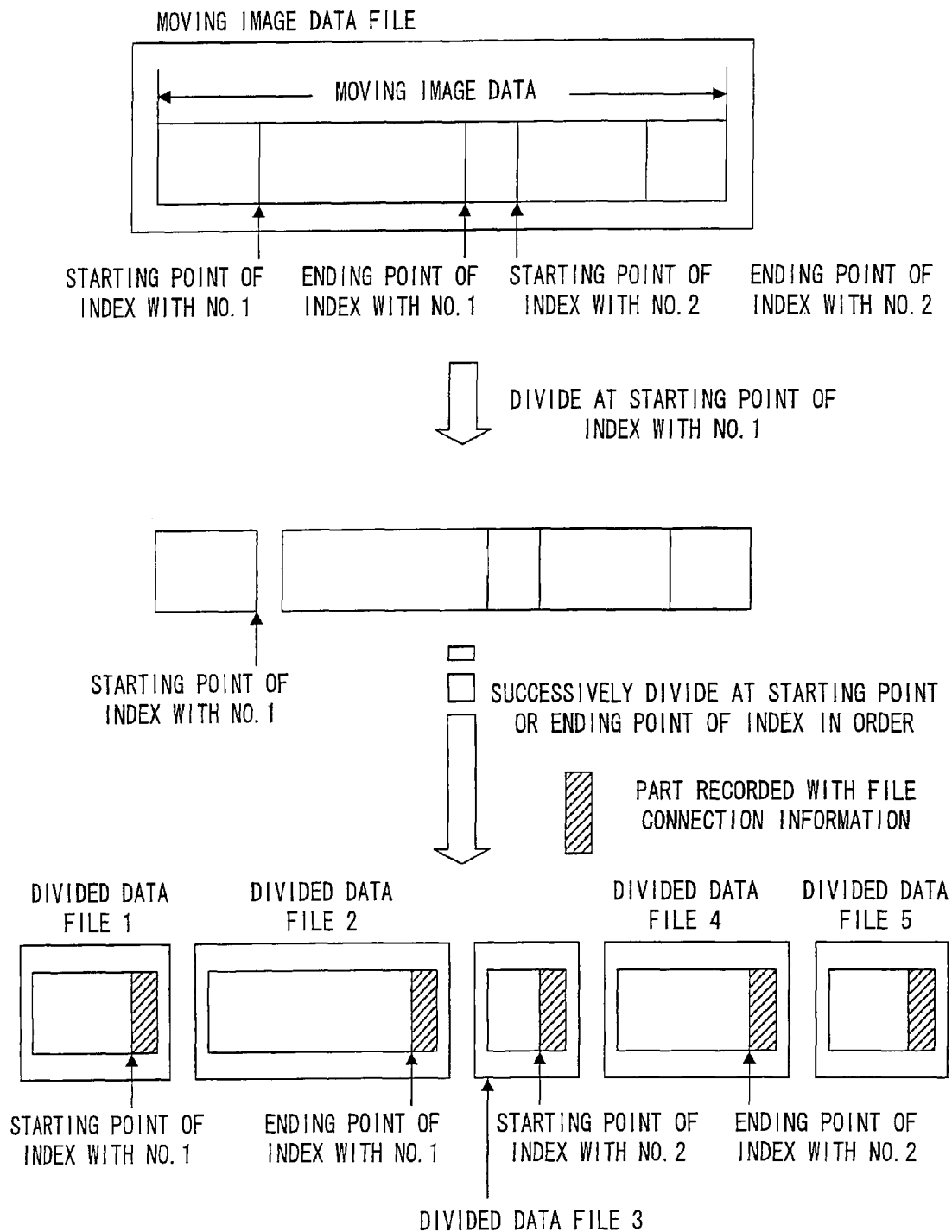
FIG. 7 is moving image data making up of a moving image data file stored in a memory card of the digital camera shown in FIG. 6.
Figure 9:
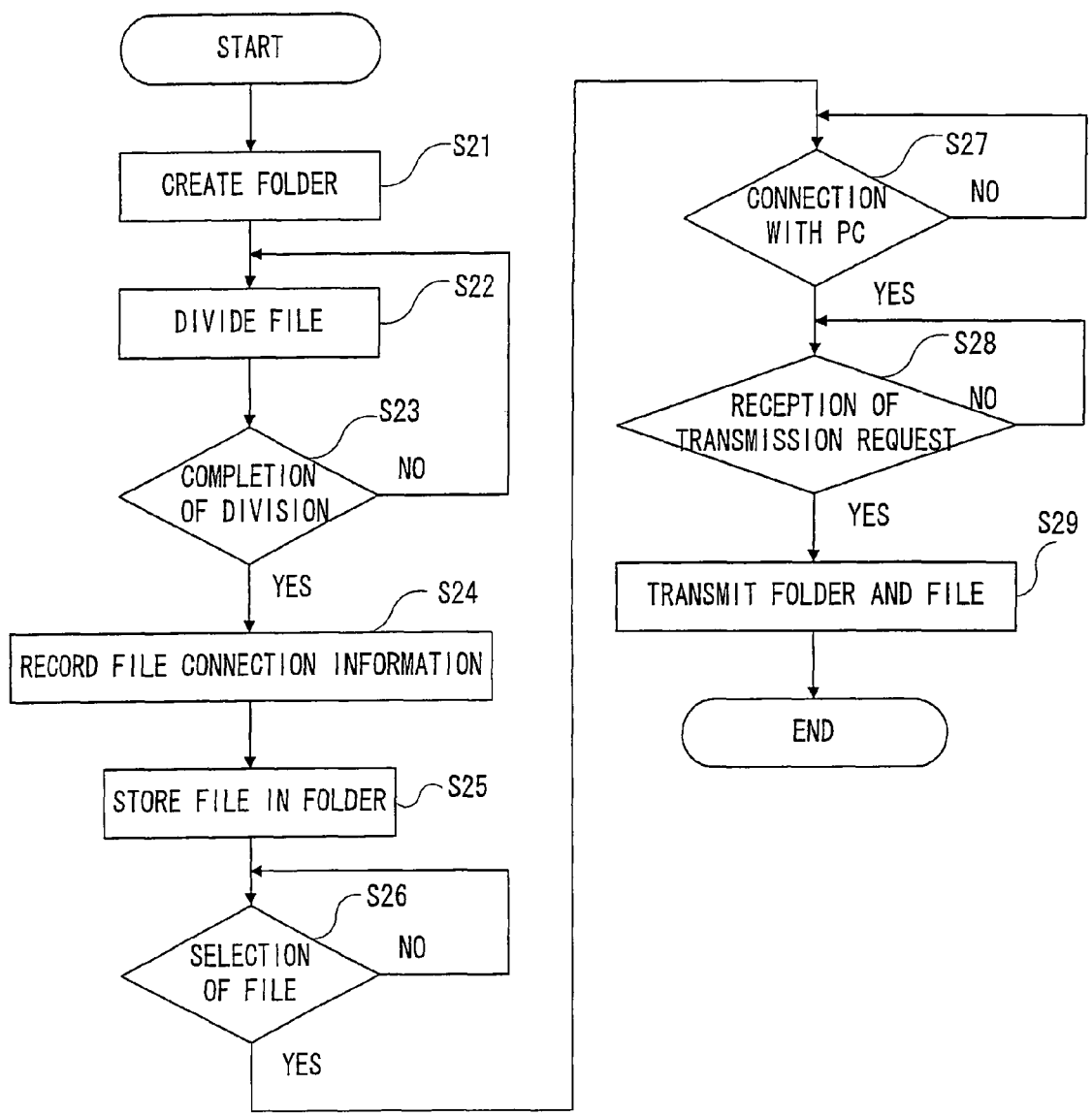
FIG. 9 is a flowchart showing transmission processing of moving image data files in the digital camera to a PC according to a third embodiment of the present invention.
Figure 10:
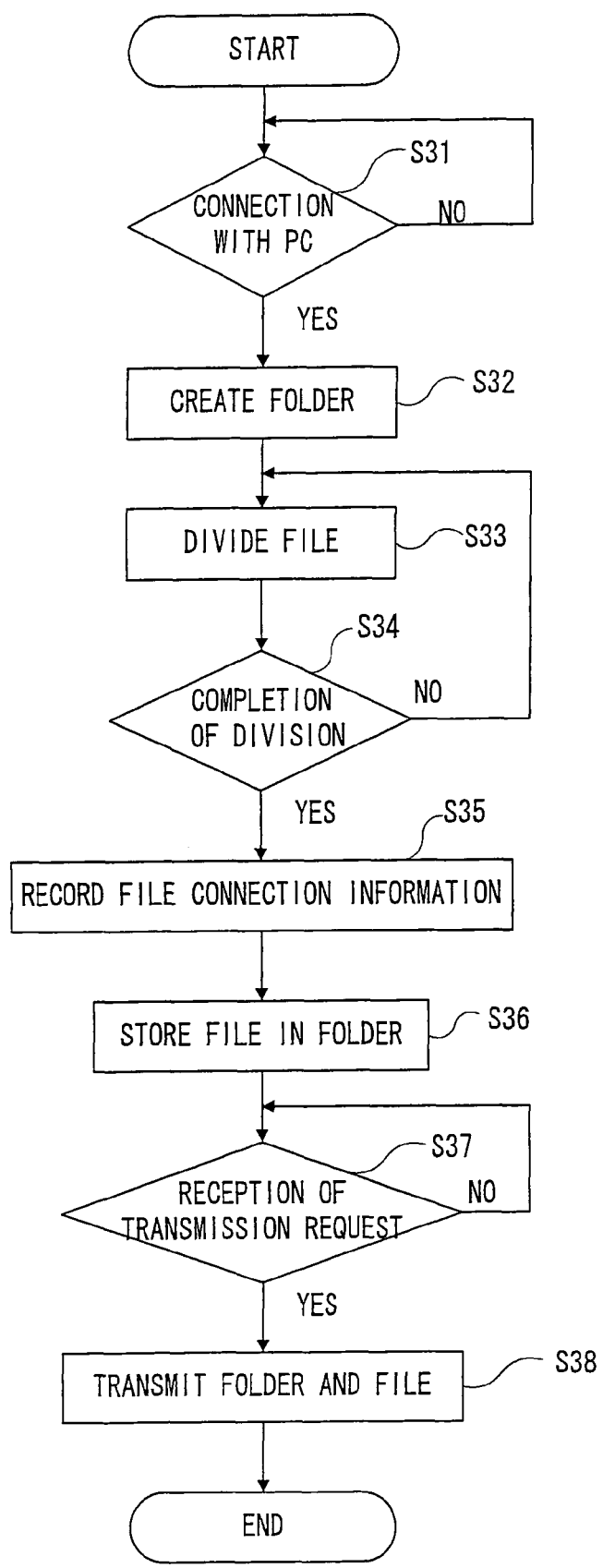
FIG. 10 is a flowchart showing transmission processing of moving image data files in the digital camera to the PC according to a fourth embodiment of the present invention.

1 IC recorder
2 PC
5 MCU
5*a* audio data file dividing circuit
5*b* audio data file selecting circuit
15 USB controller
16 USB terminal
21 digital camera
22 PC
25*a* moving image data file dividing circuit
25*b* moving image data file selecting circuit
26 CPU
35 USB controller
36 USB terminal

The invention claimed is:

1. A data recording apparatus is characterized in the data recording apparatus which stores a data file including digital data being made up of audio data and/or video data and a position information file recorded with position information indicating positions on a time axis of the digital data by being linked with the data file in that the apparatus comprising: a data file divider for performing division processing on the data file on the basis of a predetermined position on the time axis of the digital data specified by the position information to create a plurality of divided data files in a case that the data file linked with the position information file is to be transmitted to an external apparatus, and a data file transmitter for transmitting a divided data file created by the data file divider to the external apparatus.

2. A data recording apparatus according to claim 1 is characterized in that the apparatus further comprises a connector to be connected to the external apparatus, and when the connector is connected to the external apparatus, the data file divider creates the divided data files.

3. A data recording apparatus according to claim 1 is characterized in that the data file divider records divided file connection information at a predetermined part of each of the created divided data files.

4. A data recording apparatus according to claim 1 is characterized in that the data file divider creates a folder for storing the plurality of created divided data files, and the data file transmitter transmits the folder to the external apparatus.

5. A data recording apparatus according to claim 1 is characterized in that the apparatus further comprises a data file selector for selecting one or more divided data files out of the plurality of divided data files created by the data file divider to be transmitted to the external apparatus by the data file transmitter.

6. In data file transmitting method of the data recording apparatus storing a data file including digital data being made up of audio data and/or video data and a position information file recorded with position information indicating a position on a time axis of the digital data by being linked with the data file, and the data file transmitting method of the data recording apparatus is characterized by performing division processing on the data file on the basis of a predetermined position on the time axis of the digital data specified by the position information to create a plurality of divided data files in a case that the data file linked with the position information file is to be transmitted to an external apparatus, and transmitting a divided data file to the external apparatus.

7. A data file transmitting method of the data recording apparatus according to claim 6 is characterized by further comprising a connector for connecting to the external apparatus and by creating the divided data files when the connector is connected to the external apparatus.

8. A data file transmitting method of the data recording apparatus according to claim 6 is characterized by recording divided file connection information at a predetermined part of each of the divided data files.

9. A data file transmitting method of the data recording apparatus according to claim 6 is characterized by creating a folder for storing the plurality of created divided data files, and by transmitting the folder to the external apparatus.

10. A data file transmitting method of the data recording apparatus according to claim 6 is characterized by selecting one or more divided data files to be transmitted to the external apparatus out of the plurality of created divided data files.

11. A data recording apparatus according to claim 2 is characterized in that the data file divider records divided file connection information at a predetermined part of each of the created divided data files.

12. A data recording apparatus according to claim 11 is characterized in that the data file divider creates a folder for storing the plurality of created divided data files, and the data file transmitter transmits the folder to the external apparatus.

13. A data recording apparatus according to claim 2 is characterized in that the data file divider creates a folder for storing the plurality of created divided data files, and the data file transmitter transmits the folder to the external apparatus.

14. A data recording apparatus according to claim 3 is characterized in that the data file divider creates a folder for storing the plurality of created divided data files, and the data file transmitter transmits the folder to the external apparatus.

15. A data file transmitting method of the data recording apparatus according to claim 7 is characterized by recording divided file connection information at a predetermined part of each of the divided data files.

16. A data file transmitting method of the data recording apparatus according to claim 15 is characterized by creating a folder for storing the plurality of created divided data files, and by transmitting the folder to the external apparatus.

17. A data file transmitting method of the data recording apparatus according to claim 7 is characterized by creating a folder for storing the plurality of created divided data files, and by transmitting the folder to the external apparatus.

18. A data file transmitting method of the data recording apparatus according to claim 8 is characterized by creating a folder for storing the plurality of created divided data files, and by transmitting the folder to the external apparatus.

* * * * *